(12) United States Patent
Abbassi Monjezi

(10) Patent No.: US 12,722,119 B2
(45) Date of Patent: Sep. 1, 2026

(54) APPARATUS AND METHOD FOR LIQUID TREATMENT BY FORWARD OSMOSIS

(71) Applicant: WATERWHELM LTD, Edinburgh (GB)

(72) Inventor: Alireza Abbassi Monjezi, Edinburgh (GB)

(73) Assignee: WATERWHELM LTD, Edinburgh (GB)

( * ) Notice: Subject to any disclaimer, the term of this patent is extended or adjusted under 35 U.S.C. 154(b) by 706 days.

(21) Appl. No.: 17/799,852

(22) PCT Filed: Feb. 12, 2021

(86) PCT No.: PCT/GB2021/050359

§ 371 (c)(1),
(2) Date: Aug. 15, 2022

(87) PCT Pub. No.: WO2021/161046

PCT Pub. Date: Aug. 19, 2021

(65) Prior Publication Data

US 2023/0071602 A1 Mar. 9, 2023

(30) Foreign Application Priority Data

Feb. 14, 2020 (GB) ...................................... 2002089

(51) Int. Cl.
*C02F 1/44* (2023.01)
*B01D 3/06* (2006.01)
(Continued)

(52) U.S. Cl.
CPC ........... *B01D 61/0022* (2022.08); *B01D 3/06* (2013.01); *B01D 5/006* (2013.01);
(Continued)

(58) Field of Classification Search
CPC ...... B01D 61/0022; B01D 3/06; B01D 5/006; B01D 61/0023; B01D 61/005;
(Continued)

(56) References Cited

U.S. PATENT DOCUMENTS

2009/0297431 A1 12/2009 McGinnis et al.
2011/0100218 A1 5/2011 Wolfe
(Continued)

FOREIGN PATENT DOCUMENTS

CN 204661347 9/2015
WO 2015/087063 6/2015

OTHER PUBLICATIONS

United Arab Emirates (UAE) Search Report issued Oct. 8, 2024, for UAE patent Application No. AU P6001538/2022 (8 pages).
(Continued)

*Primary Examiner* — Pranav N Patel
(74) *Attorney, Agent, or Firm* — Nixon & Vanderhye P.C.

(57) ABSTRACT

A method of recovering draw agent utilised in a forward osmosis membrane cell, the method comprising the steps of passing diluted draw agent to a vapour-liquid separator; using the vapour-liquid separator to separate draw agent vapour and solvent; and condensing draw agent vapour.

20 Claims, 13 Drawing Sheets

(51) Int. Cl.
*B01D 5/00* (2006.01)
*B01D 61/00* (2006.01)

(52) U.S. Cl.
CPC ....... *B01D 61/0023* (2022.08); *B01D 61/005* (2013.01); *C02F 1/445* (2013.01); *B01D 2311/103* (2013.01); *B01D 2311/2523* (2022.08); *B01D 2311/2669* (2013.01); *B01D 2311/2674* (2022.08); *B01D 2315/10* (2013.01); *C02F 2303/10* (2013.01)

(58) Field of Classification Search
CPC ...... B01D 2311/103; B01D 2311/2523; B01D 2311/2669; B01D 2311/2674; B01D 2315/10; B01D 2311/246; B01D 61/002; B01D 61/0024; B01D 2252/102; B01D 2311/04; B01D 2311/08; B01D 2311/1032; B01D 2311/1061; B01D 2311/14; B01D 2311/2521; B01D 2313/36; B01D 53/96; C02F 1/445; C02F 2303/10; C02F 1/281; C02F 1/04; C02F 1/447; C02F 2209/02; Y02W 10/30; Y02W 10/37; Y02A 20/131
See application file for complete search history.

(56) References Cited

U.S. PATENT DOCUMENTS

| | | | | |
|---|---|---|---|---|
| 2012/0067819 | A1* | 3/2012 | McGinnis ............ | B01D 61/364 210/260 |
| 2013/0220927 | A1* | 8/2013 | Moody ................... | C02F 1/445 210/652 |
| 2013/0277308 | A1 | 10/2013 | Kim et al. | |
| 2014/0319056 | A1* | 10/2014 | Fuchigami ......... | B01D 61/0022 210/648 |
| 2016/0206993 | A1* | 7/2016 | Deng ...................... | C10L 3/104 |
| 2017/0369337 | A1* | 12/2017 | Goodman ................. | C02F 1/04 |

OTHER PUBLICATIONS

International Search Report dated May 4, 2021, for PCT/GB2021/050359, 4 pp.

Written Opinion of the ISA dated May 4, 2021, for PCT/GB2021/050359, 8 pp.

Chanhee Boo et al., "Performance evaluation of trimethylamine-carbon dioxide thermolytic draw solution for engineered osmosis", Journal of Membrane Science, vol. 473, pp. 302-309 (2015) (8 pages).

* cited by examiner

APPARATUS AND METHOD FOR LIQUID TREATMENT BY FORWARD OSMOSIS

CROSS-REFERENCE TO RELATED APPLICATION(S)

This application is the U.S. national phase of International Application No. PCT/GB2021/050359 filed Feb. 12, 2021, which designated the U.S. and claims priority to GB 2002089.7 filed Feb. 14, 2020, the entire contents of each of which are hereby incorporated by reference.

FIELD OF THE INVENTION

The invention relates to the field of forward osmosis apparatus.

BACKGROUND TO THE INVENTION

Forward osmosis utilises a semi-permeable membrane positioned between feed water containing dissolved solutes, for example waste-water or sea-water, and a draw solution. The draw solution contains a draw agent which creates a difference between the osmotic pressure of the feed water and the draw solution. The osmotic pressure difference in turn causes water to pass through the membrane from the feed water into the draw solution, leaving behind the solutes at the feed water side of the membrane and thus purifying the water of these solutes. The purified water is then separated from diluted draw solution. This separation produces concentrated draw agent, which can then be reused for further forward osmosis.

An example of this technique is disclosed in WO 2015/087063 A1 which introduced DME (dimethyl ether) as a draw agent. DME is a gas at standard temperature and pressure which may be dissolved in water at room temperature by the application of sufficient pressure to thereby form a concentrated draw agent. WO 2015/087063 A1 teaches that, after use as a draw agent, the DME may then be recovered for reuse by depressurisation of the resulting diluted draw agent to liberate gaseous DME.

However, a compressor is then required to repressurise the DME which is a device which consumes energy and which is a further device to require maintenance.

Document US 2009/0297431 discloses a method and apparatus for separating draw solution solutes and product solvent from a draw solution using a plurality of distillation columns. The draw agent is ammonium salts in solution.

Document CN 204 661 347 U discloses a low energy consumption forward osmosis seawater desalination system, including solar heating equipment. The driving fluid is an ammonia salt solution.

An article by Chanhee Boo et al, Journal of Membrane Science 473 (2015) 302-309, discloses a performance evaluation of trimethylamine-carbon dioxide thermolytic draw solution for engineered osmosis.

In the separation process of the prior art, the flow of diluted draw agent from the draw solution side of the membrane cell is depressurised, using for example a pressure exchanging unit or a pressure regulator, prior to entering the separator. This serves the dual purpose of firstly removing what is seen as waste pressure and secondly preparing the diluted draw solution for separation in a gas stripping separation unit. The excess pressure which is removed in this way can be utilised elsewhere in the fluid circuit. Thus, the prior art draw solution fluid circuit is split into a high pressure portion, incorporating the membrane cell, and a low pressure portion, incorporating the draw agent recovery apparatus. This arrangement is necessary for the function of the prior art method of draw agent recovery. However, because pressure cannot be exchanged with complete efficiency, it has the disadvantage that energy is lost.

The invention seeks to provide an improved apparatus and method for forward osmosis with recovered draw agent that in some embodiments is more energy efficient, requires less external energy input or is more practically driven by renewable energy sources.

SUMMARY OF THE INVENTION

A first aspect of the invention provides a method of recovering draw agent utilised in a forward osmosis membrane cell, the method comprising the steps of:

- passing diluted draw agent to a vapour-liquid separator;
- using the vapour-liquid separator to separate draw agent vapour and solvent;
- and condensing draw agent vapour.

A second aspect of the invention provides a forward osmosis apparatus allowing for recovery and reuse of draw agent, the apparatus comprising:

- a membrane cell for (typically cross-flow) forward osmosis, in which cell a membrane separates a feed solution side and a draw solution side;
- a vapour-liquid separator for separating draw agent and solvent;
- a draw solution exit line providing a fluid connection between said draw solution side of said membrane cell and a feed line for said vapour-liquid separator;
- a fluid connection for recirculating draw agent separated by the vapour-liquid separator to an entry line of said draw solution side of the membrane cell;
- wherein said draw solution side, said vapour-liquid separator, said draw solution exit line, said feed line, said fluid connection and said entry line together form a draw agent fluid circuit;
- wherein said draw agent fluid circuit supports an elevated fluid pressure.

A forward osmosis membrane cell is a membrane cell which is suited for performing forward osmosis. A membrane cell comprises a feed solution side separated from a draw solution side by a semi-permeable membrane. A draw agent fed into the draw solution side creates an osmotic pressure difference between the draw solution and the feed solution containing soluble impurities. This difference in osmotic pressure causes water to pass through the membrane from the feed solution to the draw solution. In the way, diluted draw agent exits the draw solution side of the forward osmosis membrane cell. The present disclosure recovers draw agent from this diluted form, by separating it from the solvent (which may be water). In this way reuse of the draw agent in the forward osmosis process is facilitated.

Draw agent vapour is first separated from the solvent using a vapour-liquid separator. The draw agent vapour is then condensed.

It may be that the draw agent vapour is condensed using the vapour-liquid separator. Preferably, at standard temperature, supplementary pressure is required to dissolve the draw agent in the solvent. Typically the pressure in the draw agent fluid circuit (i.e. hydraulic and/or static pressure) is elevated in use to greater than ambient pressure, typically greater than 1.1 atmosphere, or greater than 1.5 atmosphere, or greater than 2 atmosphere or greater than 4 atmosphere. Preferably, the draw solution is pressurised. Typically the draw solution is stored in a pressurised tank. The draw agent is typically draw agent which is gaseous at normal temperature and pressure 20° C., 1 atmosphere), allowing for easy recovery. Typically the draw agent is a fluid at normal temperature and pressure (20° C., 1 atmosphere) and is soluble in the solvent (for example soluble in water, where the solvent is water). Typically, the draw agent is sufficiently soluble in the solvent to give a draw solution which has a sufficiently high osmotic pressure to draw pure solvent (e.g. water) out of the feed solution into the draw solution. Typically, the draw agent has a boiling point of less than 0° C. Typically, the draw solution is pressurised to above atmospheric pressure and the solubility of the draw agent in the solvent is increased. Examples of suitable draw agents are dimethylether (DME), monomethylamine (MMA) or ammonia, or a mixture thereof. Low toxicity of DME is an advantage for the treatment of water. For example, at a pressure of around 4-5 bar, DME will start separating from water from about 30° C. upward to about 150° C. where no DME will remain in the water.

The goal when performing forward osmosis is often to purify water. Water is extracted through the osmosis process, passes into the draw solution containing the draw agent, and leaves behind unwanted dissolved components at the feed solution side of the membrane. In order to extract purified water however, the draw agent needs to be recovered from the diluted draw solution. The advantages of using draw agents which are normally gaseous thus becomes apparent. Heating a diluted draw solution at atmospheric or near atmospheric pressure is sufficient to remove the now undesired gaseous draw agents.

Forward osmosis also finds application in dewatering and concentrating, including sludge dewatering and sludge concentrating. The technology can also be employed in the dewatering and concentrating of digestate from anaerobic or aerobic digestion processes. In addition to forward osmosis (FO) and pressure retarded osmosis (PRO), the present technology may find further use in direct osmosis concentration (DOC), osmotic dilution (OD) and pressure assisted forward osmosis (PAFO).

In the present invention, there is no requirement to use a compressor to recompress draw agent in the gas phase. By a compressor we refer to a mechanical device that increases the pressure of a gas by reducing its volume.

Thus, typically, the method of the invention does not use a compressor for compressing recovered draw agent, especially in the gas phase. Typically, the said draw agent fluid circuit does not comprise a compressor for compressing recovered draw agent vapour.

The vapour-liquid separator may be an evaporator.

The vapour-liquid separator may comprise a flash tank, such as a flash drum. The flash tank may have a feed inlet. The flash tank may have a first outlet for a top product or vapour product, and a second outlet for a bottom product or liquid product.

The vapour-liquid separator may comprise a cooler or condenser in fluid connection with the vapour outlet. The cooler or condenser may condense the draw agent vapour by cooling.

The vapour-liquid separator may use thermal energy to separate draw agent from solvent. Thermal energy may be used to evaporate draw agent preferentially over solvent. Sufficient thermal energy may be input to avoid a requirement to compress gaseous draw agent.

The present invention maintains the draw solution fluid circuit at elevated pressure. In this way, draw agent can be recovered from the diluted draw agent directly in liquid form. Efficiency in the process is won due to there being no requirement to (re)compress recovered draw agent prior to recirculating this through the membrane cell.

Known methods separate the draw agent in a gaseous form from the solvent. This requires subsequent compression of the draw agent before it can be reutilised in the forward osmosis membrane cell. The present method avoids the necessity for compression and therefore avoids the requirement for a compressor for compressing recovered draw agent. Energy is thereby saved.

Compression of the separated gaseous draw agent causes an increase in temperature of the gas, necessitating cooling to remove heat from the compressed draw agent. The present invention avoids the necessity for this cooling. The energy efficiency of the draw agent recovery process is thereby further increased.

By vapour we refer to a substance in the gas phase at a temperature below its critical temperature. A vapour which is cooled or compressed to its saturation limit condenses, producing liquid. The present process utilises this phenomenon of condensation. In the present disclosure, condensing the draw agent vapour may produce a liquid.

It may be that the condensed draw agent liquid is mixed with solvent in a mixer. It may be that the condensed draw agent liquid is diluted in the mixer. It may be that solvent is added to the condenser to mix with condensed draw agent. It may be that the condensed draw agent liquid is diluted in the mixer with solvent from the vapour-liquid separator.

The condensed draw agent liquid may be diluted in the condenser. The condensed draw agent liquid may be diluted in a mixer downstream of the condenser. The dilution in the mixer may be a further dilution. By diluting condensed draw agent liquid with solvent, typically water, a draw solution with a concentration of draw agent appropriate for use in the forward osmosis membrane cell can be created. This process of dilution may utilise solvent or water recovered from the vapour-liquid separator.

It may be that the forward osmosis apparatus further comprises a mixer for mixing condensed draw agent vapour and solvent. The solvent may be solvent from the second outlet of the vapour-liquid separator. The solvent is thereby typically pressurised, for example to within 1 bar of the pressure at which solvent left the vapour-liquid separator (as bottom product) and typically also to within 1 bar of the pressure and which solvent (with draw agent therein) entered the vapour-liquid separator.

It may be that the condensed draw agent liquid is mixed with solvent as the draw agent is being condensed. The draw agent vapour may therefore be concurrently mixed with solvent and condensed. This may take place in a direct-contact heat exchanger, for example.

The mixing is thereby typically liquid phase mixing. The mixer is typically a liquid phase mixer. By this we mean that both the draw agent vapour and the solvent are received into the mixer in, and mixed in, the liquid phase.

It may be that diluted draw agent is heated prior to passing to the vapour-liquid separator.

The apparatus may comprise a heater to heat diluted draw agent prior to passing to the vapour-liquid separator.

It may be that heat from solvent separated in the vapour-liquid separator is used to heat diluted draw agent prior to passing to the vapour-liquid separator.

The apparatus may comprise a heat exchanger arranged to supply heat from solvent separated in the vapour-liquid separator to heat diluted draw agent prior to passing to the vapour-liquid separator. The apparatus may comprise an additional heater for further heating the diluted draw agent which has been heated by the said heat exchanger prior to passing to the vapour-liquid separator. This arrangement maximises the reuse of heat energy through heat exchange and minimises the amount of heat which has to be introduced through an additional heater.

The vapour-liquid separator may comprise a condenser.

It may be that the draw agent vapour is condensed in the condenser.

The apparatus may comprise a condenser. The condenser may comprise a heat exchanger cooling the draw agent vapour by transferring heat to the feed solution.

A condenser may be placed at the first vapour product outlet of the vapour-liquid separator.

It may be that the solvent is aqueous. A solvent which is aqueous comprises water.

The solvent which is aqueous may be water.

The pressure of the diluted draw agent, being fluid pressure, is maintained between the forward osmosis membrane cell and the entrance to the vapour-liquid separator. The fluid pressure of the diluted draw agent may be increased between the membrane cell and the entrance to the vapour-liquid separator. The fluid pressure of the diluted draw agent is kept above 4 bar, preferably above 4.5 bar, between the membrane cell and the entrance to the vapour-liquid separator.

It may be that the liquid separator comprises a flash drum. A flash drum is also known as a breakpot, a knock-out drum or knock out pot.

It may be that the draw agent vapour is condensed in a condenser.

A condenser may condense draw agent vapour by cooling the vapour. A condenser may condense draw agent vapour by applying pressure to the vapour.

The invention extends to a method of separating water from dissolved components using forward osmosis and a draw solution which is recovered by a method according to any one of the preceding claims.

The present invention relates to forward osmosis. In some embodiments, the invention relates to the recovery of draw agent which has been used to purify water (for example waste water) in a forward osmosis membrane cell.

Preferably the diluted draw agent is not depressurised between being output from the draw solution side of the membrane cell and introduced into the vapour-liquid separator. Preferably, the flow path from the output of the draw solution side of the membrane cell through the draw solution exit line to the inlet of the vapour-liquid separator does not include depressurisation means (such as an expander or pressure exchanging unit). Maintaining pressure enables the draw agent vapour to be readily condensed and a compressor for gaseous draw agent to be avoided.

It may be that solids are separated from the liquid source solution by a settling process. The method may comprise one or more additional steps of solids being separated from the liquid source solution by a settling process and fed into a Fischer-Tropsch synthesis system comprising a gasifier and a Fischer-Tropsch reactor to produce a hydrocarbonaceous product and heat.

Heat produced by the Fischer-Tropsch reactor may be used to heat the diluted draw agent to drive separation of draw agent vapour and solvent. Use of the Fischer-Tropsch process in this way leads to a synergy in that not only are hydrocarbonaceous products generated and liquid (e.g. water, wastewater) purified or concentrated by forward osmosis, but the energy to drive the regeneration of draw agent in the forward osmosis process comes from the Fischer-Tropsch process.

The Fischer-Tropsch synthesis may be carried out using a catalyst or a combination of catalysts. The Fischer-Tropsch synthesis may be carried out in a fluidised bed reactor or fixed-bed reactor or a packed bed reactor or a slurry reactor. Additionally, steam or oxygen or air may be added in the gasifier.

The pressure applied to the Fischer-Tropsch synthesis may be above 1 atm. The temperature of the Fischer-Tropsch synthesis may be above 100° C. The Fischer-Tropsch synthesis may involve a heat removal mechanism, and preferably using heat transfer oil, steam, water, pressurised water, hydrogen, or phase change materials. The Fischer-Tropsch synthesis may produce a hydrocarbon gas or vapour or liquid.

The gasifier product may be used for power generation.

The heat removed from the Fischer-Tropsch reactor or gasifier may be used for generating electricity which is then used to drive the said forward osmosis process.

Gasification may be replaced by pyrolysis. There may be a drying stage prior to gasification. Water or condensate from a drying stage may be fed into the forward osmosis process for treatment.

The Fischer-Tropsch synthesis product or the gasifier product may feed a turbine or a combined heat and power (CHP) unit or combined cooling, heat and power (CCHP) or a heat engine or combustion engine or a fuel cell for power generation. The Fischer-Tropsch synthesis may produce a fuel, biofuel, hydrogen, methanol, ethanol, dimethyl ether, diethyl ether, polymer or lubricant. The Fischer-Tropsch synthesis reactor may comprise a hydrogen-permselective membrane.

The settling process may be pre-settling, sedimentation, coagulation, flocculation, filtration, disinfection or a combination of two or more of these processes.

Alternatively a thermolytic draw solution may be employed.

The draw solution may have a higher osmotic pressure than the osmotic pressure of the liquid solution.

The source may be municipal wastewater, domestic wastewater, process wastewater, industrial wastewater, irrigation wastewater, sludge, slurry or leachate.

Chemical dosing may be used as a pre-treatment or post-treatment of the FO.

The selectively permeable layer may comprise a cellulose tri-acetate (CTA), polyamide (PA), hollow fibre membrane, or a ceramic membrane comprising ZrO2, TiO2, SiC, SiO2 and/or alumina.

The source solution may be maintained at atmospheric pressure, or less. The pressure applied to the draw solution may be 100 kPa-5000 kPa.

Inert gas (e.g. nitrogen) may be used to maintain the draw solution at the required pressure. Inert gas (e.g. nitrogen) can be used in a supplementary stripping separation stage to recover residual draw solution. In this manner, after the stripping stage, the mixture of the vapour draw solution and inert gas will undergo cooling and draw solution is recovered or separated in liquid form whilst the inert gas is recycled in a closed loop to the said stripping stage in gaseous form.

Carbon filtration (e.g. activated carbon) can be employed as a supplementary draw solution recovery stage whereby the draw solution passes through a carbon filtration unit and is captured by the carbon filter. The draw solution is then recovered intermittently in liquid form by passing through water at temperatures above 10 C.

The flow rate of the source solution into the apparatus may be varied so that water from the source solution passes through the selectively permeable layer at different velocities. The initial flux of water through the selectively permeable layer may be between 0 and 100 $l/m^2/hr$.

The method may be a continuous process. The method may be a batch process.

The source solution may be heated. The source solution may be cooled.

The source solution and draw solution may be removed from the apparatus when the osmotic pressure of the diluted draw solution is similar to, or greater than, the osmotic pressure of the source solution.

The diluted draw solution may be heated to at least 20° C.

Water may be extracted from the diluted draw solution using pressure.

Waste heat or external heat may be used for draw agent recovery.

Pressure separation may be used to extract residual solutes from within the diluted draw solution.

The method may comprise a membrane-based separation step as a post-treatment step.

It may be that extracted clean water is collected, used as a solvent for preparing the concentrated draw agent solution and/or recycled as water for the source solution in a closed loop system.

Heat energy from the compression of the gaseous draw agent may be transferred from the diluted draw solution by a heat exchanger in order to separate the draw agent from the dilute draw solution.

The method may be used for removing soluble impurities from a solution.

The method may be used for seawater desalination; brackish water desalination; brine desalination; brine concentration; or to purify water from wastewater, such as industrial effluent, agricultural or domestic effluent, or purify water from rivers or preparing water for industrial use such as cooling or water injection for enhanced oil recovery or shale oil/gas fracking, or for landfill leachate treatment, or for dewatering/dehydration applications, including but not limited to the dewatering of diluted solutions in the mining industry or in the dewatering of algae solutions, in which the solutions to be concentrated or dewatered are used as the source solution.

The method may be used for generating electrical power.

The produced water may be post-treated by one or a combination of two or more of; disinfection; ozonation; ultraviolet radiation; chemical dosing.

Heat may be supplied to the forward osmosis process and/or to the recovery of the draw by any heat source, for example (but not limited to) one or more of; solar energy; electrical energy; biomass energy; geothermal energy; low-grade heat; waste heat; heat from sewage/sewerage, refrigeration heat, air-conditioning heat, low-grade-heat; eddy current heat.

The feed to the forward osmosis process may be one or more of; seawater; brackish water; brine.

The feed to the forward osmosis process may be the condensate or wastewater from a said Fischer-Tropsch synthesis.

Wastewater or landfill leachate may be treated initially by one of: a dewatering tank; a cyclone; a centrifuge.

Instead of a Fischer-Tropsch reactor there may be one of: a hydro de-oxygenation reactor; a catalytic reformer; a catalytic depolymerisation reactor; a water-gas shift reactor; a partial combustion reactor; a hydrocracking reactor; an AFEX treatment. Thermal energy from the gasifier or the Fischer-Tropsch reactor may be used for adsorption cooling/refrigeration or absorption cooling/refrigeration. The gasifier may be replaced by a combustor or burner. The feed to the gasifier or the Fischer-Tropsch reactor may be natural gas, or methane or other gaseous hydrocarbons or vapour hydrocarbons. The feed to the gasifier may be biomass or algae or coal.

Syngas from the gasifier may feed one of:

a turbine; a micro-turbine; a cogeneration or combined heat and power (CHP) unit; or combined cooling, heat and power (CCHP) or a heat engine or combustion engine or a fuel cell to generate electricity and heat using electricity in one of:

reverse osmosis (RO); nanofiltration (NF); ultrafiltration (UF); microfiltration (MF) and the heat in one of;

forward osmosis (FO); membrane distillation (MD); multi-effect distillation (MED); multi-stage flash (MSF).

The thermal regeneration process in forward osmosis may be replaced by gas-liquid membrane separation.

The invention extends to a method of separation for the treatment of a liquid source solution, the method comprising the steps of using of passing a feed solution through a forward osmosis membrane cell and passing a draw solution comprising a solvent and a draw agent through the forward osmosis membrane cell, in which cell a membrane separates a feed solution side and a draw solution side, thereby diluting the draw agent, and recovering the draw agent by a method according to the first aspect of the invention and using the recovered draw agent to form further draw solution.

DETAILED DESCRIPTION

Figure 1:
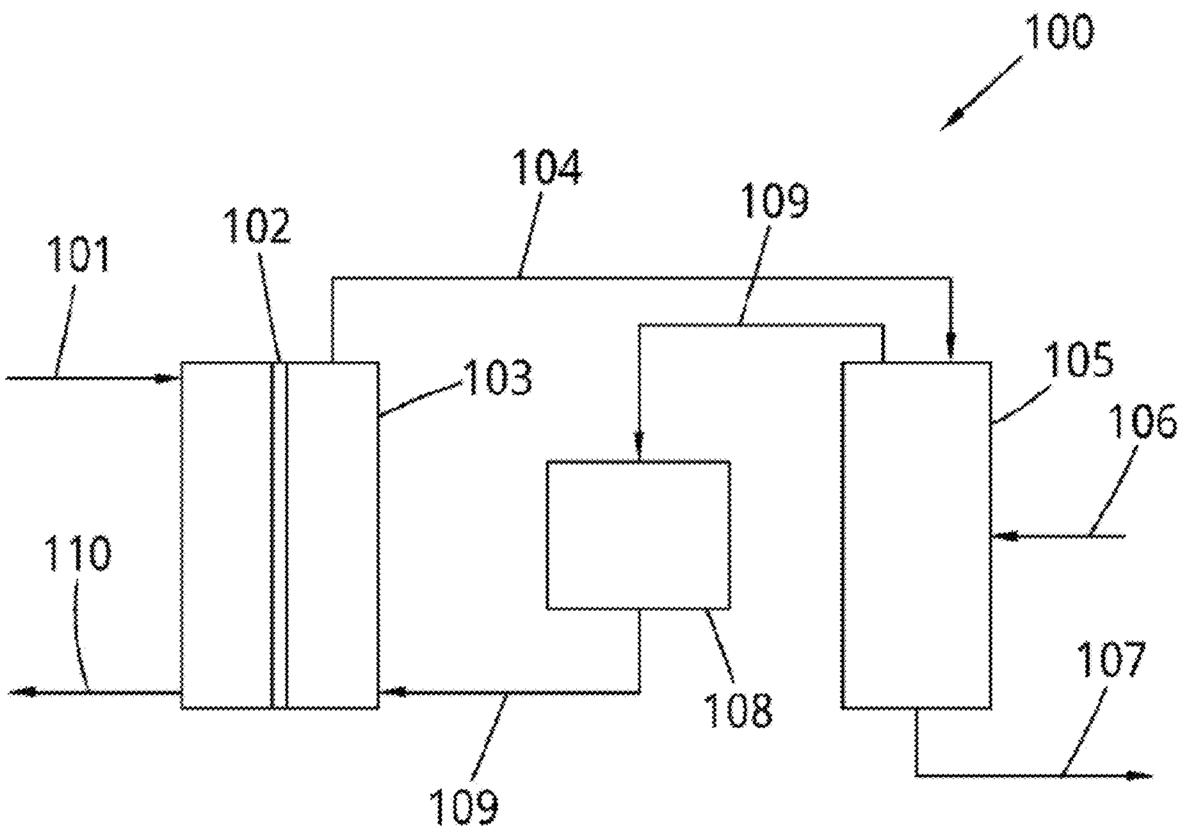
FIG. 1 is a diagram of a prior art thermal separation process.

Various methods have been introduced for separating dissolved components from solutions. Conventional wastewater treatment processes include sedimentation, coagulation, flocculation, filtration and disinfection. Membrane processes have also been used for wastewater treatment. The advantages of using membrane processes over conventional methods include compactness, ease of process control, higher efficiency and less waste product. The most common of these are reverse osmosis, nanofiltration, ultrafiltration and microfiltration. In these processes, the feed solution is placed on one side of a selectively permeable membrane where mechanical pressure is applied. However, the other side of the selectively permeable membrane is not pressurised. The pressure drives the feed solution across the membrane, leaving a concentrate on the pressurised side of the membrane. Due to the requirement for the pressure applied to the feed solution, pumps are used to facilitate the pressure elevation. Such pumps are expensive and their operation demands electricity which adds to the operations costs of the treatment process. Forward osmosis is an osmotic process using a selectively permeable membrane. The process can be employed to separate dissolved components from a solution. The driving force in forward osmosis is the osmotic pressure gradient between the source solution containing soluble impurities, and a draw solution with a higher osmotic pressure. Due to the mentioned osmotic pressure gradient water moves across the selectively permeable membrane whilst the impurities are prevented by the selectively permeable membrane to move to the other side. Thus, the draw solution is diluted with water and must be recovered to facilitate its recycling in the forward osmosis process and to recover purified water.

The present invention further introduces a method for wastewater treatment using forward osmosis, as described above, coupled to Fischer-Tropsch synthesis which is fed by a gasifier. A first solution including liquids and solids, for example wastewater, undergoes a settlement process and as a result, the liquid solution includes dissolved solids. The other product will be predominantly solids. A gasifier is then used to produce synthesis gas and a waste product such as ash or tar or char. The synthesis gas feeds a Fischer-Tropsch synthesis reactor which can produce a liquid/gas hydrocarbonaceous product and a condensate product whilst releasing heat of reaction which can be removed using a cooling medium such as heat transfer oil, steam, water, pressurised water, hydrogen, or phase change materials. The liquid product of the settlement process is contacted with the other side of a selectively permeable membrane where a second solution with a higher osmotic pressure exists so that water passes across the membrane to dilute the portion of second solution but impurities are prevented from moving to the other side by the membrane. The osmotic pressure of the draw solution is recovered by thermal separation in a distillation column where the one product will be water and the other will be concentrated draw solution. The concentrated draw solution is recycled to the forward osmosis compartment where it is contacted with the selectively permeable membrane to draw water from a first solution. However a number of variations of this in which the distillation column is substituted are described below.

FIG. 1 shows a thermal separation process 100, which is one of the known ways to recover or regenerate the draw solution. Feed water 101 is fed on to a semi-permeable membrane 102. Water passes through the membrane producing a diluted draw solution 103 on the other side of the semi-permeable membrane 102. The diluted draw solution 103 then travels along a flow path 104, into a regeneration unit 105. Heat 106 is added to the regeneration unit 105, with freshwater 107 leaving the regeneration unit 105. Draw solution is fed to a draw solution tank 108, and diluted draw solution 109 back to the semi-permeable membrane 102. Concentrate 110 is fed out of the semi-permeable membrane 102. The pressure has driven the feed water 101 across the semi-permeable membrane 102, leaving the concentrate 110 on the pressurised side of the semi-permeable membrane 102.

Figure 2:
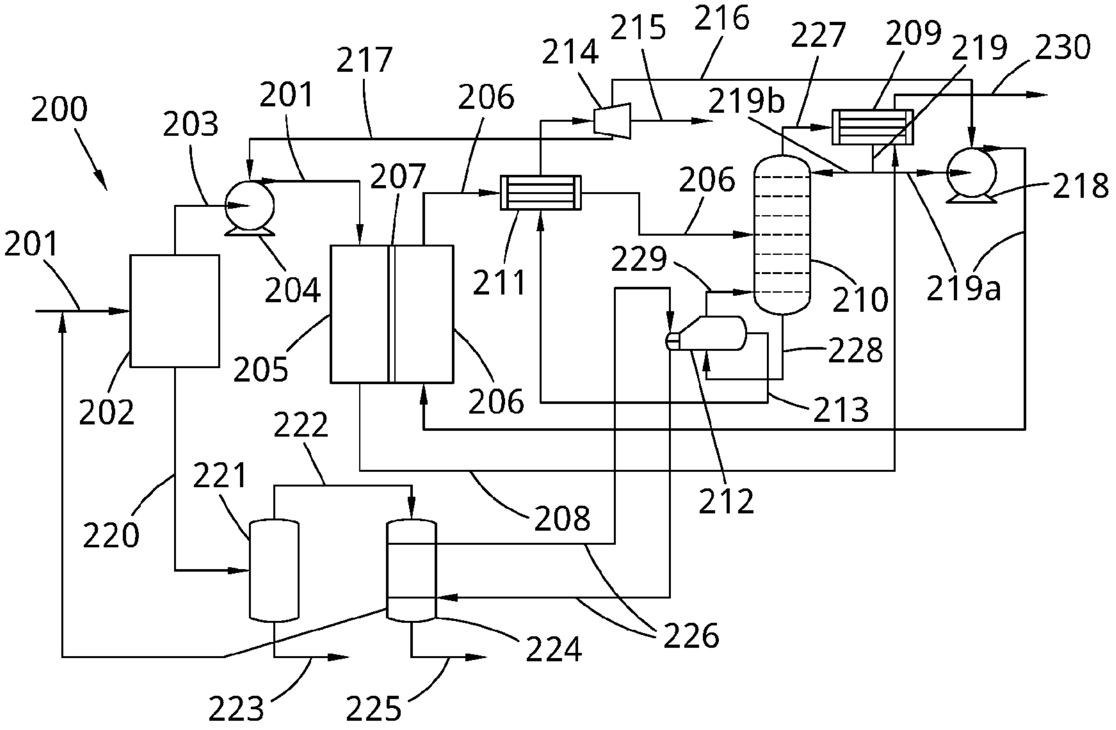
FIG. 2 is a diagram of an embodiment for treating wastewater.

FIG. 2 shows a process flow diagram 200 for an application of the invention in treating wastewater 201. Wastewater 201 feeds a separation stage 202, which in the described embodiment is a settling process, which separates the solid phase from the liquid. A liquid stream 203 feeds a first pump 204 which provides the wastewater 201 to the forward osmosis stage, with the feed solution 205 and the draw solution 206 being seen in FIG. 2.

The wastewater 201 is fed through a selectively permeable membrane 207, while the impurities are transported through a concentrate stream 208 to a condenser 209 of a distillation column 210, for use as a cooling medium. Alternatively or additionally, other cooling mediums may be used such as feed 201 or air cooling. The draw solution 206 can be seen in FIG. 2 on the other side of the selectively permeable membrane 207 from the feed solution 205. Draw solution is diluted by water passing through the membrane 207. The diluted draw solution 206 enters a preheater 211. The preheater heats the draw solution 206 before it enters the distillation column 210.

The distillation column 210 also comprises a reboiler 212, in addition to the condenser 209. This allows the distillation column 210 to produce products, via the reboiler 212 and the condenser 209. The first product (via the reboiler 212) is water 213 at a temperature of between 50 and 150 degrees ° C. at a pressure of between 300 kPa and kPa. The water 213 is used for pre-heating the draw solution 206 in the preheater 211 before it enters the distillation column 210. The energy present due to the elevated pressure of between 300 kPa and 500 kPa is recovered in an energy recovery device 214, with the output from the energy recovery device 214 being freshwater 215, originating from reboiler 212, which can be used for human consumption, irrigation or industrial use. The energy recovery device 214 converts the pressure into energy in the form of electricity 216, 217 which is used to power the first pump 204 and a second pump 218. The second product of the distillation column 210 is a concentrated draw solution vapour, which is condensed into liquid 219 by condenser 209. A first stream 219*a* of the concentrated draw solution 219 is pumped by second pump 218 (to overcome the nominal pressure drop in the distillation column 210 and condenser 209) to feed the forward osmosis stage. A second stream of the concentrated draw solution 219, a reflux stream 219*b*, is fed back into the distillation column 210. It will be appreciated that the second pump 218 may be positioned directly at the condenser 209 to pump the concentrated draw solution 219 from the condenser 209 to both the distillation column 210 as a reflux stream 219*b* and to pump the first stream 219*a* to the forward osmosis stage.

The sludge 220 from the settling process 202 enters a gasification stage 221 which produces synthesis gas 222 and a waste product 223, typically ash or tar or char. The synthesis gas 222 enters a Fischer-Tropsch synthesis reactor 224 producing hydrocarbon fuels 225. Since the reaction in the Fisher-Tropsch synthesis reactor 224 is exothermic, heat is released and can be removed using a heat transfer medium 226. The heat transfer medium 226 can be any suitable heat transfer medium including, but not limited to; heat transfer oil, steam, water, pressurised water, hydrogen, or phase change materials. In this example the heat transferred by the heat transfer medium 226 is utilised in the reboiler 212 of the distillation column 210.

The output from the bottom of the distillation column 210 is cycled through flow line 228 through the reboiler 212, and back in to the distillation column 210 through flow line 229. The vapour output from the top of the distillation column 210 is transported to the condenser 209 by flow line 227. Flow line 230 shows the concentrate which was used for cooling in the condenser.

Wastewater by-product from the Fischer-Tropsch reactor may be passed to the forward osmosis feed line 201 for treatment.

Figure 3:
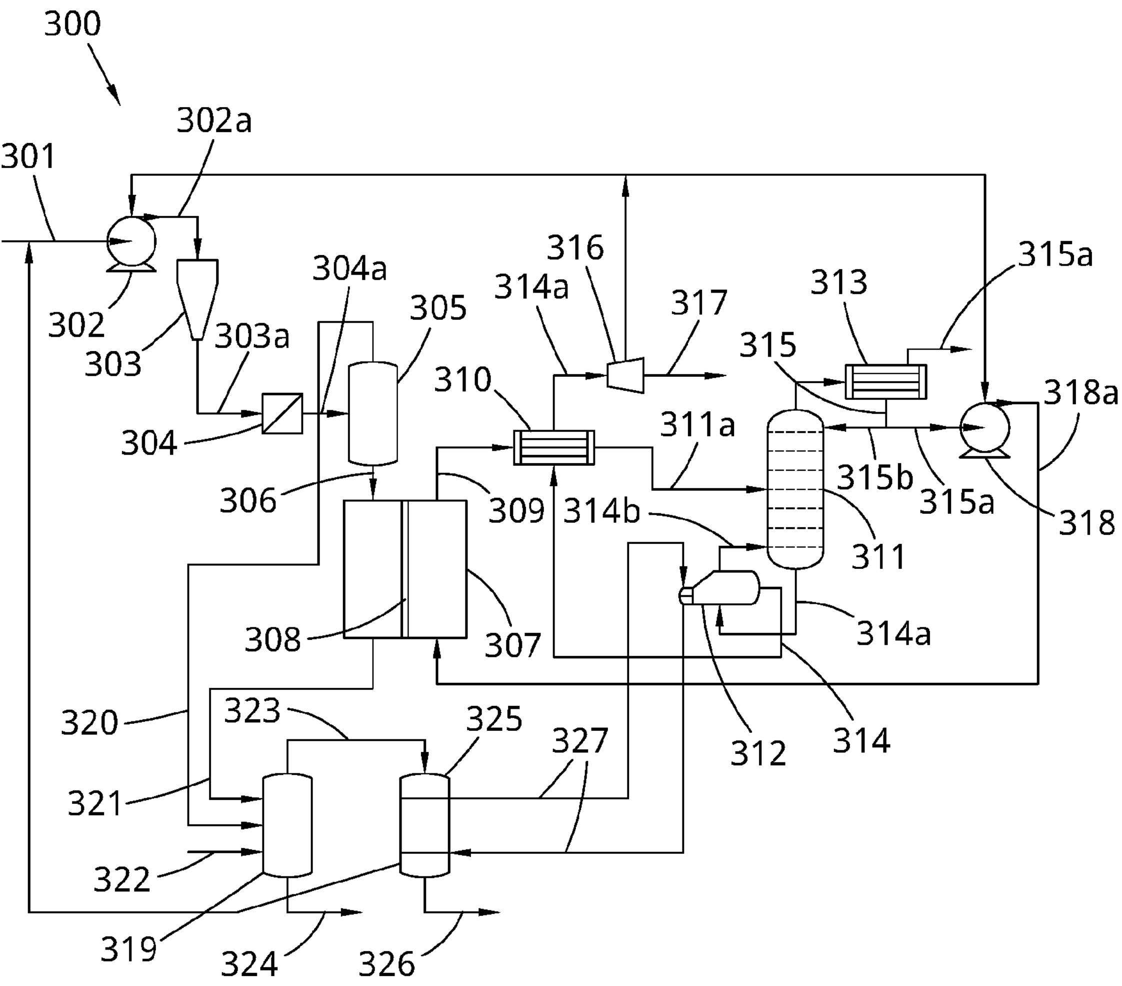
FIG. 3 is a diagram of an embodiment for treating landfill leachate.

FIG. 3 shows a process flow diagram 300 of the application of the invention in treating landfill leachate 301.

Landfill leachate 301 is pumped by a first pump 302 and associated flow line 302*a* to a hydro-cyclone 303 to remove the larger impurities in the landfill leachate 301. The flow continues along flow line 303*a* to a sand filter 304 which is then used to remove smaller impurities before passing the flow along flow line 304*a* to a degasser 305 which is used to remove the gas from the landfill leachate 301. The now liquid leachate 306 is then fed into the forward osmosis stage. The difference in the osmotic pressure between the liquid leachate 306 and the draw solution 307 causes water content in the liquid leachate 306 to move across the selectively permeable membrane 308 thus diluting the draw solution 307. The diluted draw solution 309 undergoes preheating in a preheater 310 before it enters a distillation column 311 via distillation column input flow line 311*a*. The distillation column 311 comprises a reboiler 312 and a condenser 313. The liquid output from the bottom of the distillation column flows along flow line 314*a* into the reboiler, and then along flow line 314*b* back into the distillation column 311. The distillation column 311 provides respective products of treated water 314 and draw agent vapour which is condensed into liquid form. A first stream 315*a* of the concentrated draw solution 315 is pumped by second pump 318 (to overcome the nominal pressure drop in the distillation column 311 and condenser 313) to feed the forward osmosis stage. A second stream of the concentrated draw solution 315, a reflux stream 315*b*, is fed back into the distillation column 311. It will be appreciated that the second pump 318 may be positioned directly at the condenser 313 to pump the concentrated draw solution 315 from the condenser 313 to both the distillation column 311 as a reflux stream 315*b* and to pump the first stream 315*a* to the forward osmosis stage.

The treated water 314 is at an elevated temperature of between 50 degrees ° C. and 150 degrees ° C., and at a pressure of between 300 kPa and 500 kPa. This treated water 314 is used for preheating the diluted draw solution 309 in the preheater 310 before the diluted draw solution 309 enters the distillation column 311.

The treated water 314 flows along flow line 314*a*. The energy due to the elevated pressure is recovered in an energy recovery device 316 and the product water 317 (freshwater) can be used for safe rejection to the underground or surface water sources. The electricity generated in the energy recovery device 316 is used to power the first pump 302 and a second pump 318.

The concentrated draw solution 315 in the first stream 315*a* is then pumped by the second pump 318 along flow line 318*a* (to overcome the nominal pressure drop in the distillation column 311 and condenser 313) to feed the forward osmosis stage. The reflux stream 315*b* returns to the distillation column 311. The condenser may also produce pure/treated water 315*a*.

This embodiment also includes a gasification stage 319, where gas product 320 from the degasser 305, leachate concentrate 321 from the forward osmosis stage and additional landfill waste 322 enter the gasification stage 319 which produces synthesis gas 323 and a waste product 324, which is typically ash or tar or char. The synthesis gas 323 enters a Fischer-Tropsch synthesis reactor 325 producing hydrocarbon fuels 326.

Since the reaction in the Fisher-Tropsch synthesis reactor 325 is exothermic, heat is released and can be removed using a heat transfer medium 327. The heat transfer medium 327 can be any suitable heat transfer medium including, but not limited to; heat transfer oil, steam, water, pressurised water, hydrogen, or phase change materials. The heat transferred by the heat transfer medium 327 will then be utilised in the reboiler 312 of the distillation column 311.

Wastewater by-product from the Fischer-Tropsch reactor may be passed to the forward osmosis feed line 301 for treatment.

Figure 4:
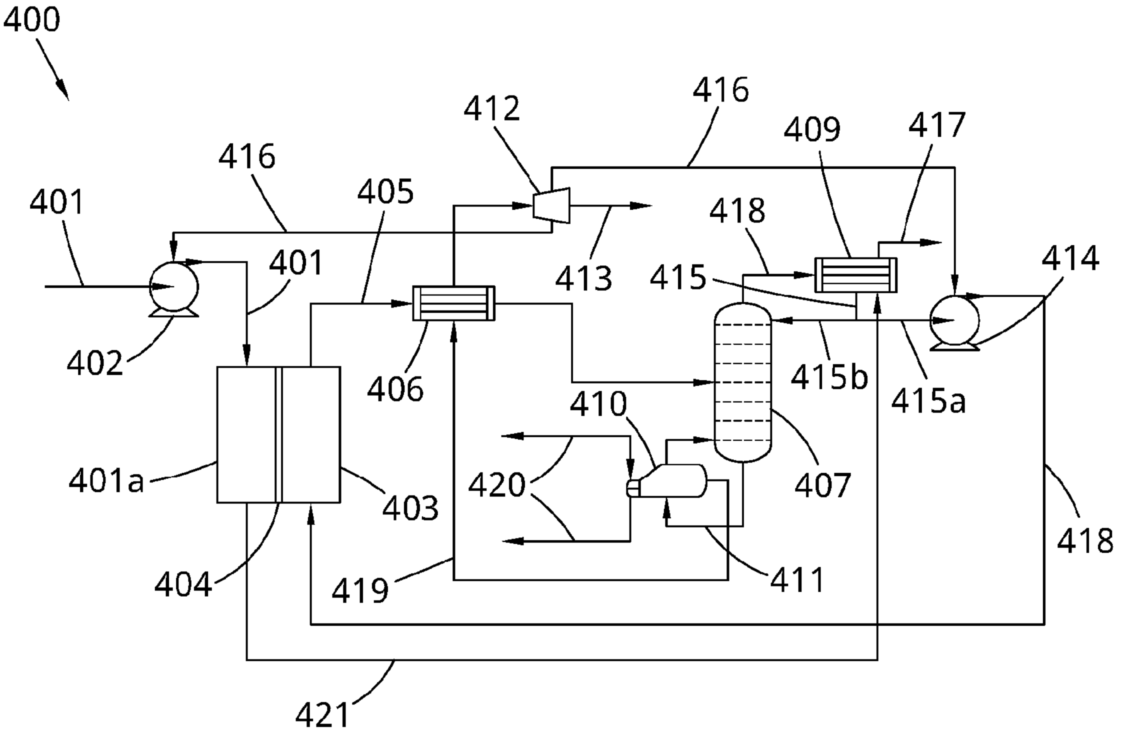
FIG. 4 is a diagram of an embodiment for application in wastewater treatment, desalination of seawater or brackish water or brine, driven by solar thermal energy, geothermal energy or waste heat.

FIG. 4 shows a process flow diagram 400 for the application of the invention in wastewater treatment, desalination of seawater or brackish water or brine, driven by solar thermal energy, geothermal energy or waste heat.

Feed water 401, typically wastewater, seawater or brackish water or brine, is pumped by a first pump 402 to the forward osmosis stage. The difference in the osmotic pressure between the feed water 401 on the feed side 401*a* and the draw solution 403 causes the movement of water across the selectively permeable membrane 404 thus diluting the draw solution 403. The diluted draw solution 405 undergoes preheating in a preheater 406 before it enters a distillation column 407. Impurities from the feed flow are transported via a concentrate stream for use as a cooling medium in the condenser 409 of the distillation column 407. The reboiler 410 produces pure/treated water 419 at an elevated temperature of between 50 degrees ° C. and 150 degrees ° C., and at a pressure of between 300 kPa and 500 kPa. This pure/treated water 419 is used for preheating the diluted draw solution 405 in the preheater 406 before the diluted draw solution 405 enters the distillation column 407.

The energy due to the elevated pressure of the water leaving the reboiler is recovered in an energy recovery device 412 and the product water 413 (freshwater) can be used for human consumption, irrigation and industrial use. The electricity generated in the energy recovery device 412 is used to power the first pump 402 and a second pump 414.

The liquid product of the condenser 409, the concentrated draw solution 415 can be seen in FIG. 4. A first stream 415*a* of concentrated draw solution 415 is pumped by the second pump 414 (to overcome the nominal pressure drop in the distillation column 407 and condenser 409) to feed the forward osmosis stage. A second stream of the concentrated draw solution 415, a reflux stream 415*b*, is fed back into the distillation column 407. It will be appreciated that the second pump 414 may be positioned directly at the condenser 409 to pump the concentrated draw solution 415 from the condenser 409 to both the distillation column 407 as a reflux stream 415*b* and to pump the first stream 415*a* to the forward osmosis stage along flow line 418.

Heat released by solar thermal energy, geothermal energy or waste heat is used to power the reboiler 410 of the distillation column 407 using a heat transfer medium 420. The heat transfer medium 420 can be any suitable heat transfer medium which will be apparent to a person skilled in the art.

Electricity 416 to power the pumps 402 and 414, the condensate 417 from the condenser 409, the treated water 419 from the reboiler 410, the distillation column bottom product stream 411 and the concentrate 421 used as a cooling medium for the condenser 409, can be seen in FIG. 4. Alternatively, or additionally, the feed solution and/or air cooling may also be used as a cooling medium.

Figure 5:
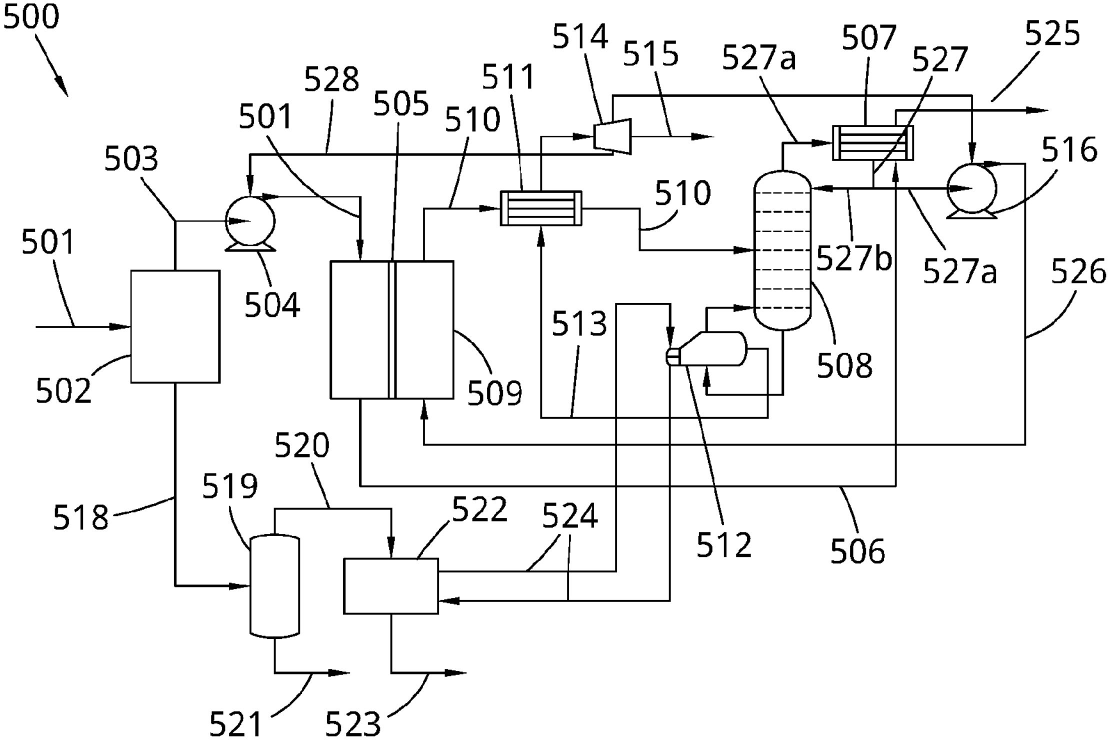
FIG. 5 is a diagram of an embodiment for wastewater treatment involving a turbine or CHP unit.

FIG. 5 shows a process flow diagram 500 of the application of the invention in wastewater treatment involving a turbine or CHP unit.

Wastewater 501 (such as municipal wastewater) feeds a separation stage 502, which in the described embodiment is a settling process, which separates the solid phase from the liquid. The liquid stream 503 feeds a first pump 504 which provides wastewater 501 to the forward osmosis stage. Water is transported through a selectively permeable membrane 505 while the impurities are transported via a concentrate stream 506 for use as a cooling medium in the condenser 507 of the distillation column 508. The cooling medium may alternatively or additionally be the feed 501 and/or air cooling.

The water transported through the selectively permeable membrane 505 dilutes the draw solution 509. The diluted draw solution 510 undergoes preheating in the preheater 511 before the diluted draw solution 510 enters the distillation column 508. The distillation column 508 produces a bottom product which enters a reboiler 512, providing pure/treated water 513 an at elevated temperature of between 50 degrees 18° C. and 150 degrees ° C., and at a pressure of between 300 kPa and 500 kPa, which is used for preheating the diluted draw solution 510 in the preheater 511 before the diluted draw solution 510 enters the distillation column 508.

The energy due to the elevated pressure is recovered in an energy recovery device 514 and the product water 515 (freshwater) can be used for human consumption, irrigation and industrial use. The electricity generated in the energy recovery device 514 is used to power the first pump 504 and a second pump 516.

Sludge 518 from the settling process 502 enters a gasification stage 519 which produces synthesis gas 520 and a waste product 521, typically ash or tar or char. The synthesis gas 520 enters a turbine, micro-turbine or a cogeneration or combined heat and power (CHP) unit 522 which produces heat and electricity 523. The heat will then be utilised in the reboiler 512 of the distillation column 508 and electricity 523 can be used for other purposes. The heat will be transferred to the reboiler 512 using a heat transfer medium 524. The heat transfer medium 524 can be any suitable heat transfer medium which will be apparent to a person skilled in the art.

The overhead vapour product 527*a* from the distillation column is fed into the condenser 507. A first stream 527*a* of the concentrated draw solution 527 from the condenser 507 is pumped by the second pump 516 (to overcome the pressure drop in the distillation column 508 and condenser 507) to feed the forward osmosis stage. A second stream of the concentrated draw solution 527, a reflux stream 527*b*, is fed back into the distillation column 508. It will be appreciated that the second pump 516 may be positioned directly at the condenser 507 to pump the concentrated draw solution 527 from the condenser 507 to both the distillation column 508 as a reflux stream 527*b* and to pump the first stream 527*a* to the forward osmosis stage along flow line 526.

The concentrate 527 from the condenser 507 is shown in FIG. 5, along with the electricity generated in the energy recovery device 514.

In each of the embodiments illustrated in FIGS. 2, 3 and 5, it is additionally possible that water reclaimed from the drying of the gasifier feedstock can also be recirculated to the forward osmosis unit for treatment.

Figure 6:
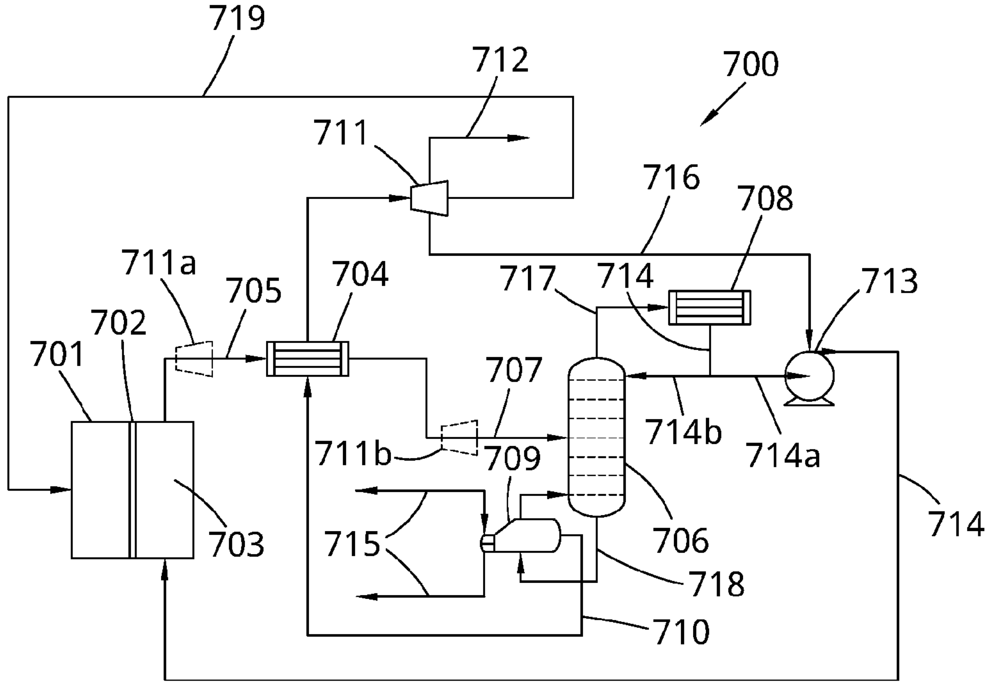
FIG. 6 is a diagram of an embodiment for generating electricity in a closed-loop system.

FIG. 6 shows a process flow diagram 700 of an application of the invention involving generating electricity in a closed-loop system.

Similarly to the previously described flow diagrams, there is a forward osmosis stage with movement of water across the selectively permeable membrane 702 causing a dilution of the draw solution 703. The diluted draw solution 403 flows to the preheater 704 along flow line 705. The diluted draw solution 703 undergoes preheating in the preheater 704 before it enters the distillation column 706 via flow line 707. The reboiler 709 produces pure/treated water 710 at an elevated temperature of between 50° C. and 150° C., and at a pressure of between 300 kPa and 500 kPa. This pure/treated water 710 is used for preheating the diluted draw solution 703 in the preheater 704 before the diluted draw solution 703 enters the distillation column 706.

The energy due to the elevated pressure of the reboiler output is recovered in an energy recovery device 711 and the produced electricity 712 can be used for various uses. A proportion of the electricity generated in the energy recovery device 711 is used to power the pump 713. FIG. 6 shows the energy recovery device 711 located downstream of the preheater 704 and between the preheater 704 and the forward osmosis stage. Alternatively, the energy recovery device 711 may be located at a first alternative position 711*a* downstream of the forward osmosis stage before the preheater 704. Alternatively, the energy recovery device 711 may be located at a second alternative position 711*b* downstream of the preheater 704 between the preheater 704 and the distillation column 706.

The distillation column 706 overhead vapour product flow line 717 carries the liquid overhead product to the condenser 708 where liquid is condensed. A first stream 714*a* of the concentrated draw solution 714 from the condenser 708 is pumped by the second pump 713 (to overcome the pressure drop in the distillation column 706 and condenser 708) to feed the forward osmosis stage. A second stream of the concentrated draw solution 714, a reflux stream 714*b*, is fed back into the distillation column 706. It will be appreciated that the second pump 713 may be positioned directly at the condenser 708 to pump the concentrated draw solution 714 from the condenser 708 to both the distillation column 706 as a reflux stream 714*b* and to pump the first stream 714*a* to the forward osmosis stage.

The heat to power the reboiler 709 of the distillation column 706 can be provided by solar thermal energy, geothermal energy or waste heat.

Heat released by solar thermal energy, geothermal energy or waste heat is used to power the reboiler 709 of the distillation column 706 using a heat transfer medium 715. The heat transfer medium 715 can be any suitable heat transfer medium which will be apparent to a person skilled in the art.

Electricity 716 to power the pump 713, the distillation column 706 bottom product stream 718 and the product water 719 feeding back to the forward osmosis stage 701 can be seen in FIG. 6. Cooling in the condenser 708 can be carried out using the feed solution, seawater, river water or air cooling.

In all of the described embodiments, the overhead product from the vapour-liquid separator, which can comprise the distillation column or the combination of the distillation column and the condenser, is liquid. This is achieved through control of pressure and eliminates the need for a compressor.

Figure 7:
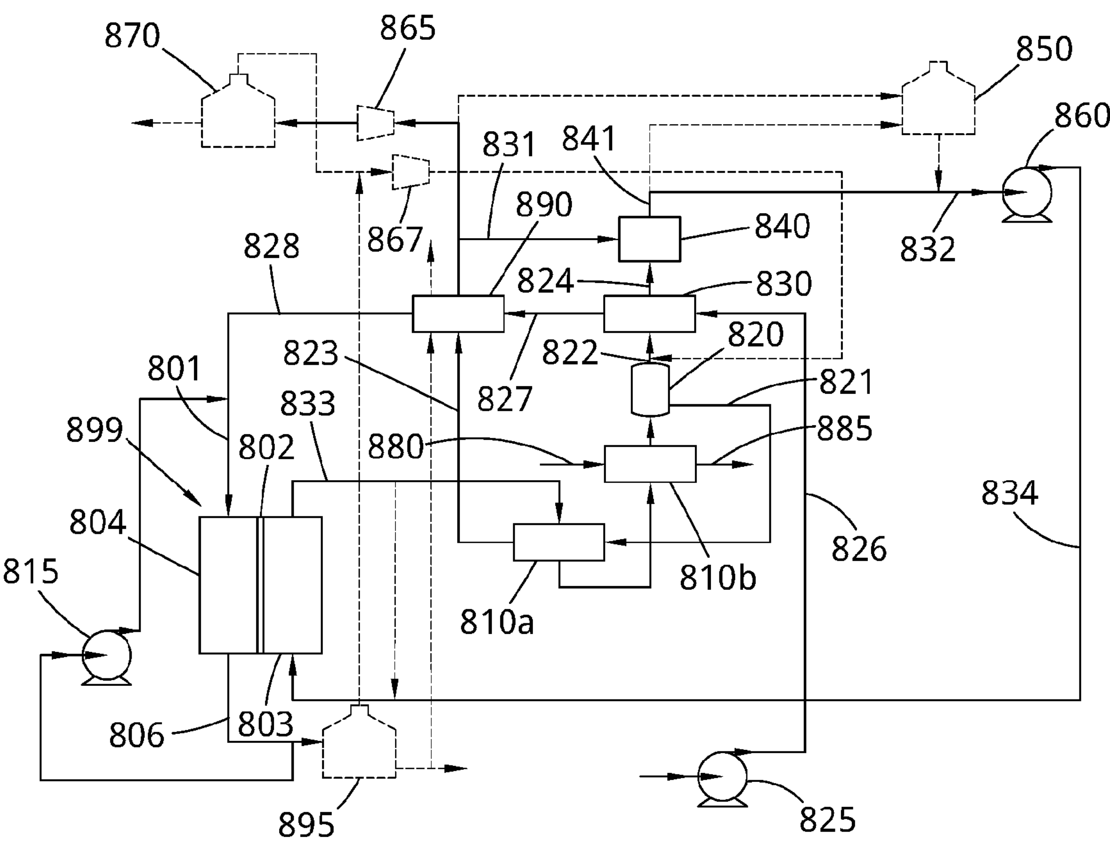
FIG. 7 is a diagram of an embodiment including a liquid-phase mixer and a flash drum.

FIG. 7 shows a process flow diagram for the application of the invention in wastewater treatment, landfill leachate treatment, desalination of seawater or brackish water or brine, driven by solar thermal energy, geothermal energy or waste heat. In this and other examples the draw agent is DME.

Feed water, typically wastewater, landfill leachate, seawater or brackish water or brine, is pumped by a pump 825 to a forward osmosis stage. The forward osmosis input-line pressure is between 100 kPa to 800 kPa. The difference in the osmotic pressure between the feed water 801 on the feed side 804 of forward osmosis cell 899 and the solution on the draw solution side 803 causes the movement of water across the selectively permeable membrane 802, hence diluting the draw solution. The diluted draw solution can be partially or fully recirculated 833 before it undergoes preheating in a heat exchanger 810*a*, 810*b* before it enters a separator vessel 820. Separator 820 can be a flash vessel or a separator or a drum. The separator 820 produces, as bottom product 821, water at an elevated temperature of between 30° C. and 150° C., and at a pressure of between 100 kPa and 700 kPa. This water is used for preheating the diluted draw solution in the preheater 810*a*, 810*b* before the diluted draw solution enters the flash vessel or separator or drum 820.

The separator produces, as top product 822, DME vapour which is cooled by a heat exchanger or cooler or condenser 830 to feed a liquid phase mixer 840. The mixer 840 can be one of an agitator mixer, impeller mixer, blade mixer, paddle mixer, sparging mixer, spraying mixer, in-pipe mixer, baffled mixer, homogenizer, electrically driven mixer or eductor. The mixer 840 is also fed by a proportion of the produced and cooled pure/treated water 831. The product of the mixer 841 is then transferred to the draw solution tank 850 at a pressure between 100 kPa and 700 kPa. The draw solution tank 850 feeds a pump 860 which circulates the draw solution 834 to the forward osmosis unit.

The concentrate 806 arising from dewatering of the feed solution can be fully or partially recirculated 815 from concentration tank 895 as feed to the forward osmosis unit to reduce or eradicate concentrate discharge or increase production. The concentrate can also be transferred to a tank 870 at reduced pressure where the draw solution resulting from reverse flux is separated after a given residence time and re-pressurised using a compressor or a pump into the process.

The heat 880 to power the heat exchanger 810*b* can be provided by solar thermal energy or geothermal energy or waste heat or any other thermal energy source.

Heat released by solar thermal energy, geothermal energy or waste heat can be used to power the heater using a heat transfer medium. The heat transfer medium can be any suitable heat transfer medium which will be apparent to a person skilled in the art.

Alternatively, or additionally, the concentrate and/or air cooling may also be used as a cooling medium in the process. FIG. 7 shows feedwater being used as a cooling medium in by condenser 830, and also by heat exchanger 890 used to cool bottom product water prior to passage to the liquid phase mixer 840, and/or elsewhere, such as the draw solution tank 850, or via expander 865 tank 870.

Liquid stored in tank 870 may be reintroduced into the pressurised system via expander 867 to dilute top product 822 from separator 820.

The draw solution and draw agent remain pressurised around the draw agent recuperation circuit. This facilitates the separation of draw agent vapour from the water and subsequent condensation of the draw agent vapour (rather than pressurising draw agent gas with a compressor).

Figure 8:
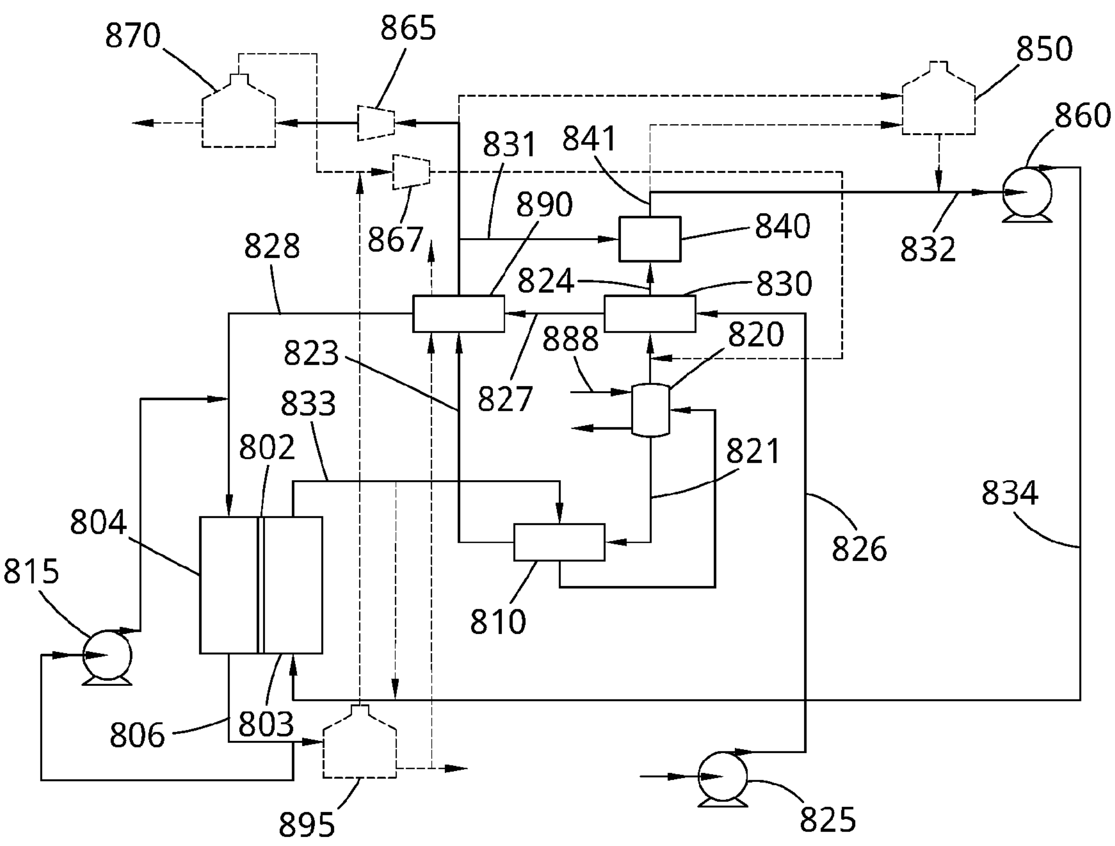
FIG. 8 is a diagram of an embodiment with a liquid-phase mixer and two pre-heaters.

FIG. 8 shows a process flow diagram for the application of the invention in wastewater treatment, landfill leachate treatment, desalination of seawater or brackish water or brine, driven by solar thermal energy, geothermal energy or waste heat.

The system illustrated in FIG. 8 is similar to that illustrated in FIG. 7 and the same reference numerals have been used. FIG. 8 illustrates utilisation of a single heat exchanger prior to the diluted draw solution entering the separator 820.

The separator 820 may be an evaporator or a reboiler or a thermosiphon.

Feed water, typically wastewater, landfill leachate, seawater or brackish water or brine, is pumped by a pump to a forward osmosis stage. The difference in the osmotic pressure between the feed water on the feed side and the draw solution side causes the movement of water across the selectively permeable membrane and hence diluting the draw solution. The diluted draw solution can be partially or fully recirculated before it undergoes preheating in a heat exchanger 910 before it enters a vapour-liquid separator 920, which can be an evaporator or a reboiler or a thermosiphon. The impurities are transported via a concentrate stream which can be used as a cooling medium in either heat exchangers (the two coolers). The evaporator or reboiler or thermosiphon 920 produces, as bottom product, water at an elevated temperature of between 30 degrees ° C. and 150 degrees ° C., and at a pressure of between 100 kPa and 700 kPa. This water is used for preheating the diluted draw solution in the preheater 910 before the diluted draw solution enters the evaporator or reboiler or thermosiphon 920.

The evaporator or reboiler or thermosiphon 920 produces as top product, a vapour which is cooled by a heat exchanger or cooler or condenser 930 to feed a mixer 940 which can be one of agitator mixer, impeller mixer, blade mixer, paddle mixer, sparging mixer, spraying mixer, in-pipe mixer, baffled mixer, homogenizer, electrically driven mixer or eductor. The mixer is also fed by a proportion of the produced and cooled water. The product of the mixer is then transferred to the draw solution tank 950 at a pressure between 100 kPa and 700 kPa. The draw solution tank 950 feeds a pump 960 which circulates the draw solution to the forward osmosis unit.

The concentrate can be fully or partially recirculated as feed to the forward osmosis unit to reduce or eradicate concentrate discharge or increase production. The concentrate can then be transferred to a tank 970 at reduced pressure where the draw solution resulting from reverse flux is separated after a given residence time and re-pressurised using a compressor or a pump into the process.

The heat 980 to power the evaporator or reboiler or thermosiphon 920 can be provided by solar thermal energy or geothermal energy or waste heat or any other thermal energy source.

Heat released by solar thermal energy, geothermal energy or waste heat can be used to power the heater using a heat transfer medium. The heat transfer medium can be any suitable heat transfer medium which will be apparent to a person skilled in the art.

Alternatively, or additionally, the concentrate and/or air cooling may also be used as a cooling medium in the process.

Figure 9:
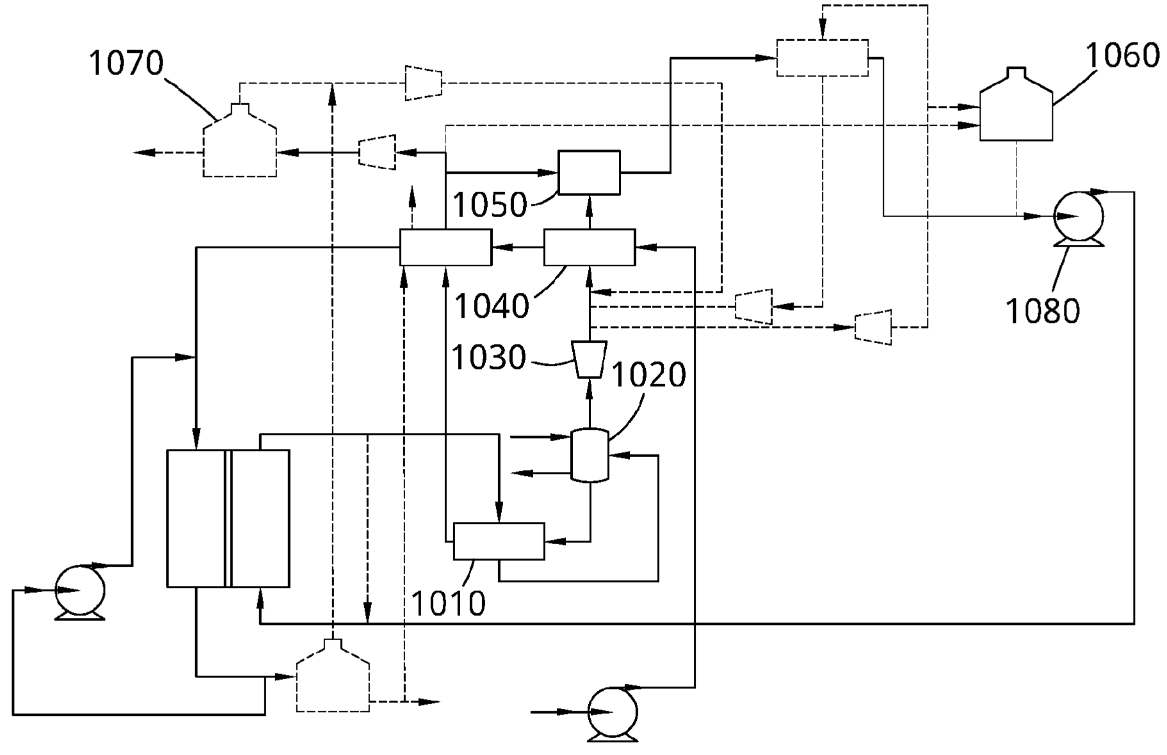
FIG. 9 is a diagram of an embodiment including a cooling process.

FIG. 9 shows a process flow diagram for the application of the invention in wastewater treatment, landfill leachate treatment, desalination of seawater or brackish water or brine, driven by solar thermal energy, geothermal energy or waste heat. Dashed lines represent optional features which will be described.

Feed water, typically wastewater, landfill leachate, seawater or brackish water or brine, is pumped by a pump to a forward osmosis stage. The difference in the osmotic pressure between the feed water on the feed side and the draw solution side causes the movement of water across the selectively permeable membrane and hence diluting the draw solution. The diluted draw solution can be partially or fully recirculated before it undergoes preheating in a heat exchanger 1010 before it enters a vapour-liquid separator 1020, which can be an evaporator or a reboiler or a thermosiphon, while the impurities are transported via a concentrate stream which can be used as a cooling medium. The evaporator or reboiler or thermosiphon 1020 produces, as bottom product, water at an elevated temperature of between 30 degrees ° C. and 150 degrees 8° C., and at a pressure of between 100 kPa and 700 kPa. This water is used for preheating the diluted draw solution in the preheater 1010 before the diluted draw solution enters the evaporator or reboiler or thermosiphon 1020.

The energy due to the elevated pressure of the water bottom product is recovered in an energy recovery device or turbine and the product water (freshwater) can be used for human consumption, irrigation and industrial use. The electricity generated in the energy recovery device can be used to power the equipment in the process. The water can then be transferred to a tank 1070 at reduced pressure where the remaining draw solution is separated after a given residence time and re-pressurised using a compressor or a pump into the process.

The evaporator or reboiler or thermosiphon produces as top product, a vapour which is de-pressurized using an energy recovery device or a turbine 1030 and then further cooled by a heat exchanger or cooler or condenser 1040 to feed a mixer 1050 which can be one of agitator mixer, impeller mixer, blade mixer, paddle mixer, sparging mixer, spraying mixer, in-pipe mixer, baffled mixer, homogenizer, electrically driven mixer or eductor. The vapour can alternatively be used in a refrigeration/cooling cycle to cool draw solution before re-compression as shown, prior to feeding the mixer. The mixer is also fed by a proportion of the produced and cooled water. The product of the mixer is then transferred to the draw solution tank 1060 at a pressure between 100 kPa and 700 kPa. The draw solution tank feeds a pump 1080 which circulates the draw solution to the forward osmosis unit.

The concentrate can be fully or partially recirculated as feed to the forward osmosis unit to reduce or eradicate concentrate discharge or increase production. The concentrate can then be transferred to a tank at reduced pressure where the draw solution resulting from reverse flux is separated after a given residence time and re-pressurised using a compressor or a pump into the process.

The heat to power the evaporator or reboiler or thermosiphon 1020 can be provided by solar thermal energy or geothermal energy or waste heat or any other thermal energy source.

Heat released by solar thermal energy, geothermal energy or waste heat can be used to power the heater using a heat transfer medium. The heat transfer medium can be any suitable heat transfer medium which will be apparent to a person skilled in the art.

Alternatively, or additionally, the concentrate and/or air cooling may also be used as a cooling medium in the process.

Instead of the use of an expander, turbine or energy recovery device 1030 the system may use a cooling/refrigeration cycle. At the vapour pressure of the draw agent is raised because of heating, as a result the total pressure of the vapour product leaving the separator will be higher than the system pressure and therefore some of this pressure can be converted to either electrical energy using an expander/turbine/energy recovery device or to cooling using a cooling/refrigeration cycle. Various options are shown using dashed lines.

Figure 10:
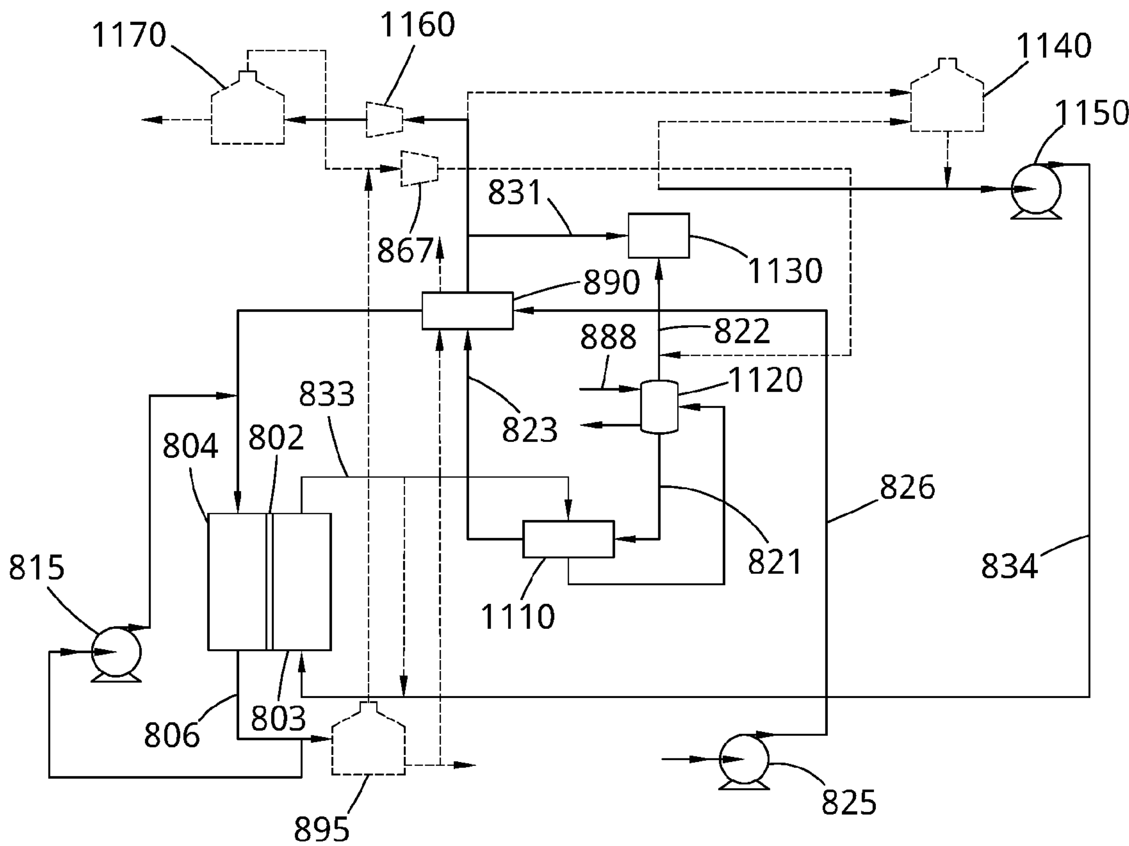
FIG. 10 is a diagram of an embodiment using a direct-contact cooling and mixing process.

FIG. 10 shows a process flow diagram for the application of the invention in wastewater treatment, landfill leachate treatment, desalination of seawater or brackish water or brine, driven by solar thermal energy, geothermal energy or waste heat.

Feed water, typically wastewater, landfill leachate, seawater or brackish water or brine, is pumped by a pump to a forward osmosis stage. The difference in the osmotic pressure between the feed water on the feed side and the draw solution side causes the movement of water across the selectively permeable membrane and hence diluting the draw solution. The diluted draw solution can be partially or fully recirculated before it undergoes preheating in a heat exchanger 810 before it enters a vapour-liquid separator 820, which can be an evaporator or a reboiler or a thermosiphon, while the impurities are transported via a concentrate stream which can be used as a cooling medium. The evaporator or reboiler or thermosiphon produces, as bottom product, water at an elevated temperature of between 30 degrees° C. and 150 degrees° C., and at a pressure of between 100 kPa and 700 kPa. This water is used for preheating the diluted draw solution in the preheater 810 before the diluted draw solution enters the evaporator or reboiler or thermosiphon 820.

The energy due to the elevated pressure is recovered in an energy recovery device or turbine 865 and the product water (freshwater) can be used for human consumption, irrigation and industrial use. The electricity generated in the energy recovery device can be used to power the equipment in the process. The water can then be transferred to a tank 870 at reduced pressure where the remaining draw solution is separated after a given residence time and re-pressurised using a compressor or a pump into the process.

The evaporator or reboiler or thermosiphon 820 produces as top product, a vapour which is cooled by direct contact heat exchange in a mixer 845 which can be one of agitator mixer, impeller mixer, blade mixer, paddle mixer, sparging mixer, spraying mixer, in-pipe mixer, baffled mixer, homogenizer, electrically driven mixer or eductor. The mixer, also serving as a direct contact heat exchanger, is also fed by a proportion of the produced and cooled pure/treated water. The product of the mixer can then be transferred to the draw solution tank 850 at a pressure between 100 kPa and 700 kPa. The draw solution tank feeds a pump 860 which circulates the draw solution to the forward osmosis unit.

The concentrate can be fully or partially recirculated as feed to the forward osmosis unit to reduce or eradicate concentrate discharge or increase production. The concentrate can then be transferred to a tank at reduced pressure where the draw solution resulting from reverse flux is separated after a given residence time and re-pressurised using a compressor or a pump into the process.

The heat to power the evaporator or reboiler or thermosiphon can be provided by solar thermal energy or geothermal energy or waste heat or any other thermal energy source.

Heat released by solar thermal energy, geothermal energy or waste heat can be used to power the heater using a heat transfer medium. The heat transfer medium can be any suitable heat transfer medium which will be apparent to a person skilled in the art.

Alternatively, or additionally, the concentrate and/or air cooling may also be used as a cooling medium in the process.

Figure 11:
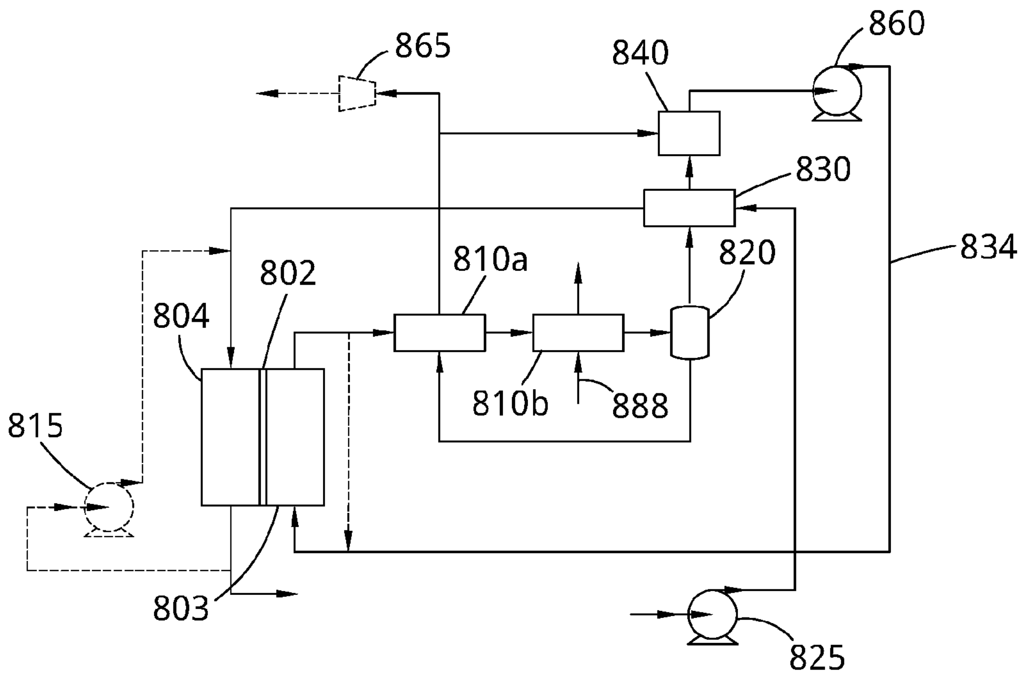
FIG. 11 is a diagram of an embodiment driven by solar thermal energy, geothermal energy or waste heat.

FIG. 11 shows a process flow diagram 100 for the application of the invention in wastewater treatment, landfill leachate treatment, desalination of seawater or brackish water or brine, driven by solar thermal energy, geothermal energy or waste heat. In this case, the vapour-liquid separator 820 has two outlets, one to the condenser 830 (top product) and one to the preheater 810*a* (bottom product). A heat exchanger/heater 810*b*, which can also be an evaporator or reboiler or thermosiphon, can be powered by solar thermal energy or geothermal energy or waste heat or any other thermal energy source and serves to increase the temperature of the diluted draw solution prior to separation at the separator 820.

Figure 12:
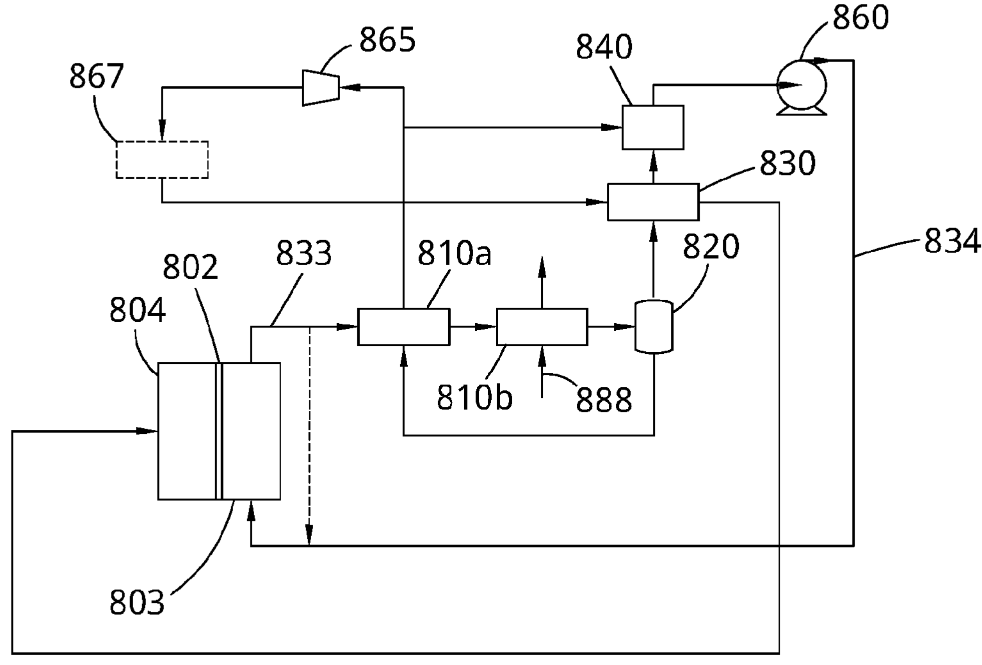
FIG. 12 is a diagram of a pressure retarded osmosis process embodiment.

The heat is going to the heat exchanger/heater and then to separator but this could be done with an evaporator or reboiler or thermosiphon FIG. 12 shows a process flow diagram for the application of the invention in pressure retarded osmosis for power generation, driven by solar thermal energy, geothermal energy or waste heat.

Again, the vapour-liquid separator 820 has two outlets, one to the condenser 830 (top product) and one to the preheater 810*a* (bottom product). A heat exchanger/heater 810*b*, which can also be an evaporator or reboiler or thermosiphon, can be powered by solar thermal energy or geothermal energy or waste heat or any other thermal energy source and serves to increase the temperature of the diluted draw solution prior to separation at the separator 820.

Figure 13:
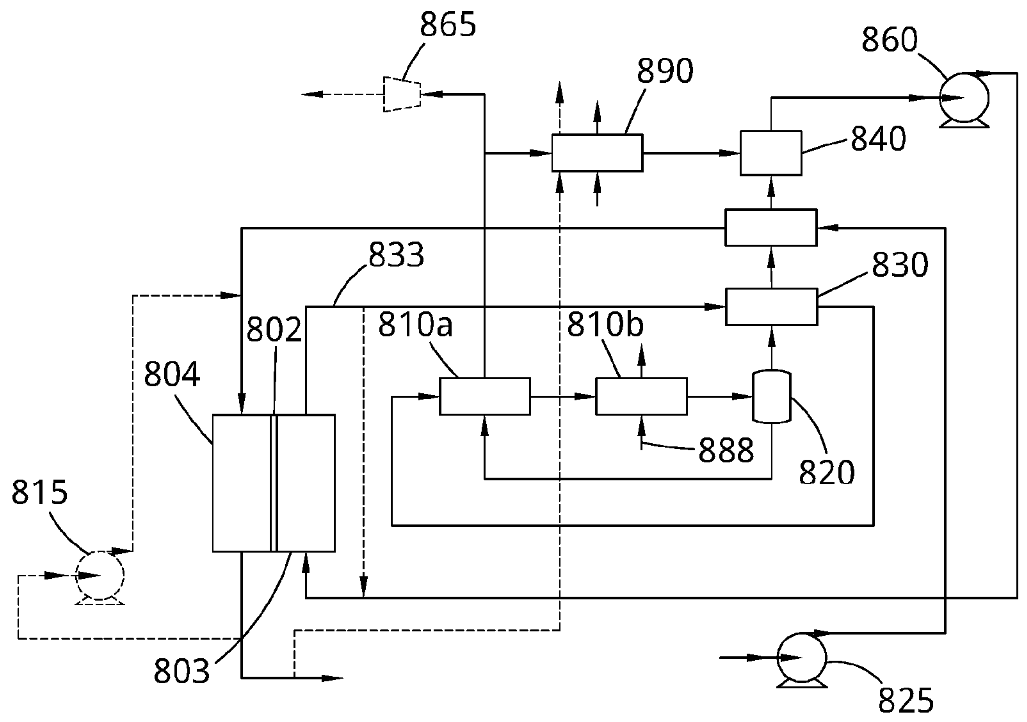
FIG. 13 is a diagram of an alternative embodiment.

FIG. 13 shows a process flow diagram for the application of the invention in wastewater treatment, landfill leachate treatment, desalination of seawater or brackish water or brine, driven by solar thermal energy, geothermal energy or waste heat.

The invention claimed is:

1. A method of recovering draw agent utilised in a forward osmosis membrane cell used for desalination or water purification, the method comprising the steps of:

passing diluted draw agent to a vapour-liquid separator;

using the vapour-liquid separator to separate the diluted draw agent into draw agent vapour and solvent; and condensing the draw agent vapour, thereby recovering the draw agent as a liquid, wherein the method utilizes the forward osmosis membrane cell, in which cell a membrane separates a feed solution side and a draw solution side, a draw solution exit line providing a fluid connection between the draw solution side of the membrane and a feed line for the vapour-liquid separator, a fluid connection for recirculating the draw agent separated by the vapour-liquid separator to an entry line of the draw solution side of the membrane cell, and wherein the draw solution side, the vapour liquid separator, the draw solution exit line, the feed line, the fluid connection and the entry line together form a draw solution fluid circuit, whereby a pressure of the draw solution fluid circuit is elevated to and maintained at greater than atmospheric pressure so that the draw agent vapour is condensed to thereby recover the draw agent as a liquid; and whereby the method does not use a compressor for compressing draw agent in a gas phase.

2. A method according to claim 1, wherein the condensed draw agent vapour which has been recovered as a liquid is mixed with solvent in a mixer, wherein both the draw agent vapour which has been recovered as a liquid and the solvent are received into the mixer in, and mixed in, a liquid phase, or diluted in a condenser.

3. A method according to claim 1 using thermal energy to separate the draw agent from solvent, wherein sufficient thermal energy is input such that compression of the draw agent in the gas phase is not required.

4. A method according to claim 1, wherein the diluted draw agent is heated prior to passing to the vapour-liquid separator.

5. A method according to claim 4, wherein heat from solvent separated in the vapour-liquid separator is used to heat the diluted draw agent prior to passing to the vapour-liquid separator.

6. A method according to claim 5, wherein the heated diluted draw agent is further heated by an additional heater using an external heat source or power supply.

7. A method according to claim 1, wherein the draw agent vapour is concurrently mixed with solvent and condensed in a direct-contact heat exchanger.

8. A method according to claim 1, wherein the pressure of the draw solution fluid circuit is elevated to greater than 1.5 atmosphere or greater than 2 atmosphere or greater than 4 atmosphere, so that the draw agent vapour is condensed to thereby recover the draw agent as a liquid.

9. A method according to claim 1, wherein the method comprises condensing the draw agent vapour thereby recovering the draw agent as a liquid, and wherein said liquid is an overhead product from the vapour-liquid separator.

10. A method according to claim 1, wherein the solvent is pressurised.

11. A method according to claim 10, wherein the condensed draw agent vapour which has been recovered as a liquid is mixed with the pressurised solvent.

12. A method according to claim 10, wherein the solvent is pressurised to within 1 bar of the pressure at which the solvent left the vapour-liquid separator.

13. A method according to claim 1, wherein the draw agent remains pressurised around the draw solution fluid circuit.

14. A method according to claim 1, wherein the draw agent vapour is condensed in a condenser, and wherein a pressure in the condenser is maintained at elevated pressure.

15. A forward osmosis apparatus configured to perform the method according to claim 1 and to allow for recovery and reuse of the draw agent, the apparatus comprising:

the forward osmosis membrane cell for forward osmosis, in which cell the membrane separates a feed solution side and a draw solution side;

the vapour-liquid separator for separating the draw agent vapour and the solvent;

the draw solution exit line providing the fluid connection between said draw solution side of said membrane cell and the feed line for said vapour-liquid separator;

the fluid connection for recirculating the draw agent separated by the vapour-liquid separator to the entry line of said draw solution side of the membrane cell;

wherein said draw solution side, said vapour-liquid separator, said draw solution exit line, said feed line, said fluid connection and said entry line together form the draw solution fluid circuit;

wherein said draw solution fluid circuit supports and maintains pressure greater than atmospheric pressure; and wherein the apparatus does not contain the compressor for compressing the draw agent in the gas phase.

16. An apparatus according to claim 15, wherein the vapour-liquid separator is flash tank, such as a flash drum, having a first outlet for a top product or vapour product, and a second outlet for a bottom product or liquid product.

17. An apparatus according to claim 15, comprising a heater to heat the diluted draw agent prior to passing to the vapour-liquid separator.

18. An apparatus according to claim 15, wherein the vapour-liquid separator comprises a condenser for condensing the draw agent vapour.

19. A method according to claim 1, wherein the draw agent is one or more of dimethylether (DME), monomethylamine (MMA) or ammonia, or a mixture thereof.

20. A method according to claim 1, wherein the solvent is water.

* * * * *